United States Patent
Chang

[19]

[11] Patent Number: 5,820,243
[45] Date of Patent: Oct. 13, 1998

[54] AIR SUSPENDED LUMINARY

[76] Inventor: Chih-Chen Chang, No. 32, Kuang-Hwa South St., Shinchu City, Taiwan

[21] Appl. No.: 816,151

[22] Filed: Mar. 12, 1997

[51] Int. Cl.⁶ .................................................. B64D 47/02
[52] U.S. Cl. ............................ 362/62; 362/234; 362/252; 362/253; 362/391; 362/806
[58] Field of Search ..................................... 362/234, 249, 362/252, 253, 391, 62, 806, 96, 403, 407

[56] References Cited

U.S. PATENT DOCUMENTS

| | | | |
|---|---|---|---|
| 292,317 | 1/1884 | Joseph | 362/62 |
| 1,039,476 | 9/1912 | Austin | 362/62 |
| 1,994,535 | 3/1935 | Roth | 362/62 |
| 4,126,850 | 11/1978 | Randolph | 362/391 |
| 4,997,403 | 3/1991 | Akman | 362/96 |
| 5,057,981 | 10/1991 | Bowen et al. | 362/249 |

*Primary Examiner*—Alan Cariaso
*Attorney, Agent, or Firm*—Rosenberg, Klein & Bilker

[57] ABSTRACT

The present invention provides an air suspended luminary that includes balloons and luminaries. By means of floating balloons, the present invention is to suspend an end of a string of luminaries on the bottom of the balloon, the another end of the string of luminary is fixed on the ground to control the suspending height. Said balloon can connect with the string of luminaries through a hollow transparent connecting object. The present invention can be combined with many balloons and strings of the luminaries to create varied shapes and used in varied field especially in an expense of open field.

1 Claim, 5 Drawing Sheets

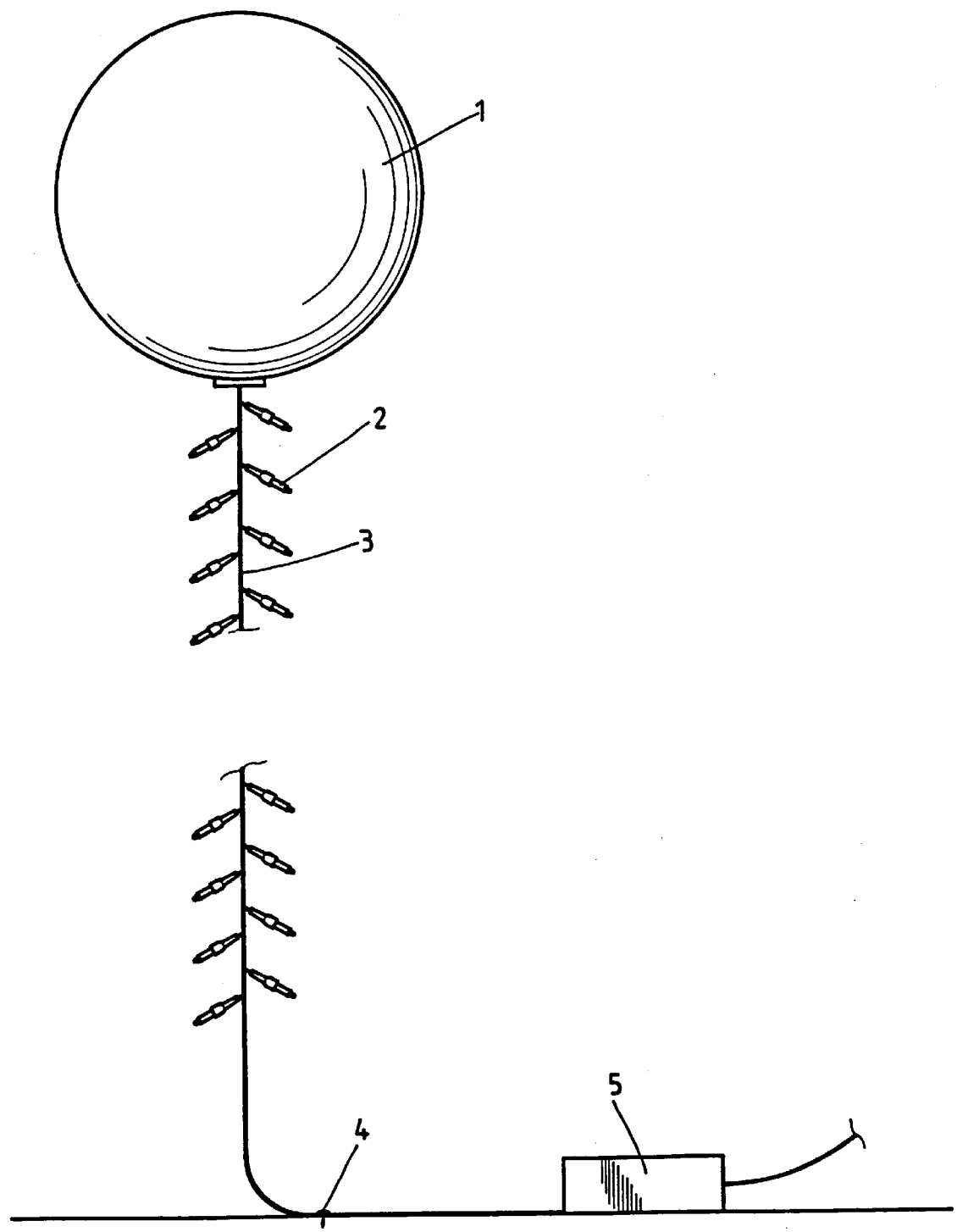
F I G . 1

AIR SUSPENDED LUMINARY

BACKGROUND OF THE INVENTION (1) Field of the Invention

The present invention relates to an air suspended luminary, and more particularly to a luminary suspended on the air by means of floating balloons.

(2) Description of Prior Art

In accordance with the traditional luminaries, most of which are hanging on a permanent building, or twined round a tree. If a luminary is to be hang on an open field like square and play ground where there are no any object that can be attached on, suspending luminaries on the air becomes a difficult thing, especially to suspend at a higher position.

OBJECTS AND SUMMARY OF THE INVENTION

It is therefore one object of this invention to provide a luminary which can be suspended in any field especially on an open field and catch a higher position.

By means of floating balloons, the present invention is to suspend an end of a string of luminaries at the bottom portion of the balloon, the other end of the string of luminary is fixed on the ground to control the suspending height altitude.

In the other way, a connecting object is suspended on the bottom of the balloon directly, and there is a threaded hole at the bottom of the connecting object for fixing one end of the string of luminary with a bolt, the other end of the string of the luminary is fixed on the ground.

Said luminary can be micro-bulb. In this way, many balloons can be employed to combine a space structure with many strings of the luminaries in different shapes and patterns.

BRIEF DESCRIPTION OF THE DRAWINGS

FIG. 1 is a side view showing an operation of the present invention;

DETAILED DESCRIPTION OF PREFERRED EMBODIMENTS

Figure 2:
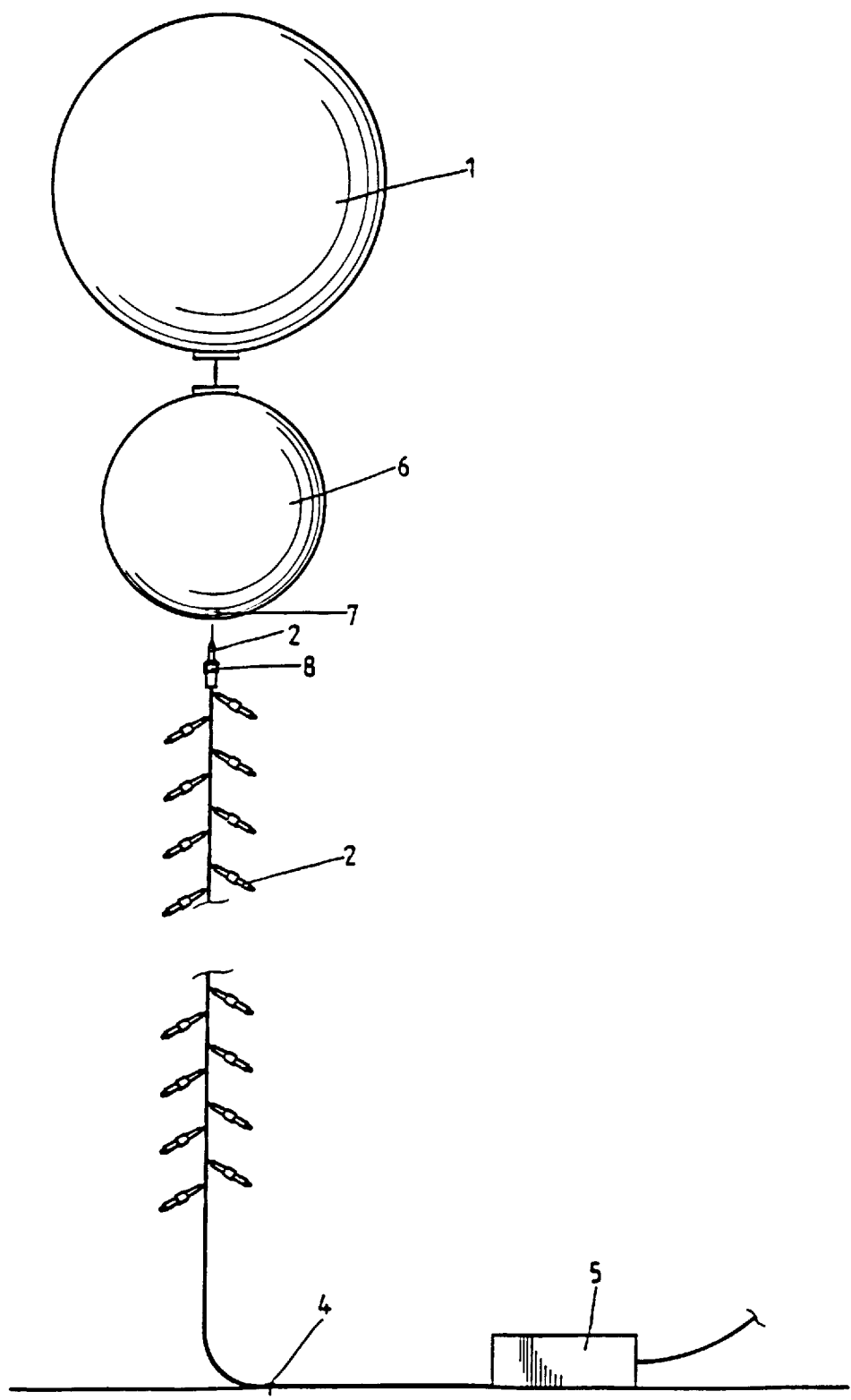
FIG. 2 is a side view showing an operation with a connecting object of the present invention.

Referring to FIG. 1, the present invention includes a balloon 1, micro-bulbs 2, cords 3, a bolt 4, and a power source 5. Therein with the cords 3 coming from the power source 5 the micro-bulbs 2 are stringed by a string, in which one end is connected on the bottom of the balloon 1, the other end is fixed on the ground with the bolt 4.

Referring to FIG. 2, a connecting object 6 is tied on the bottom of the balloon 1, in which there is a threaded hole 7 formed at the bottom of the connecting object 6 for fixing one end of the string of the micro-bulbs 2 with a bolt 8, on the other hand, a micro-bulb 2 can be attached to the top threaded end of the bolt 8 so that it can be fixed in the inside of the connecting object 6 as the bolt 8 is bolted in the threaded hole 7 on the connecting object 6. The connecting object 6 can be a hollow transparent object in varied shape.

Figure 3:
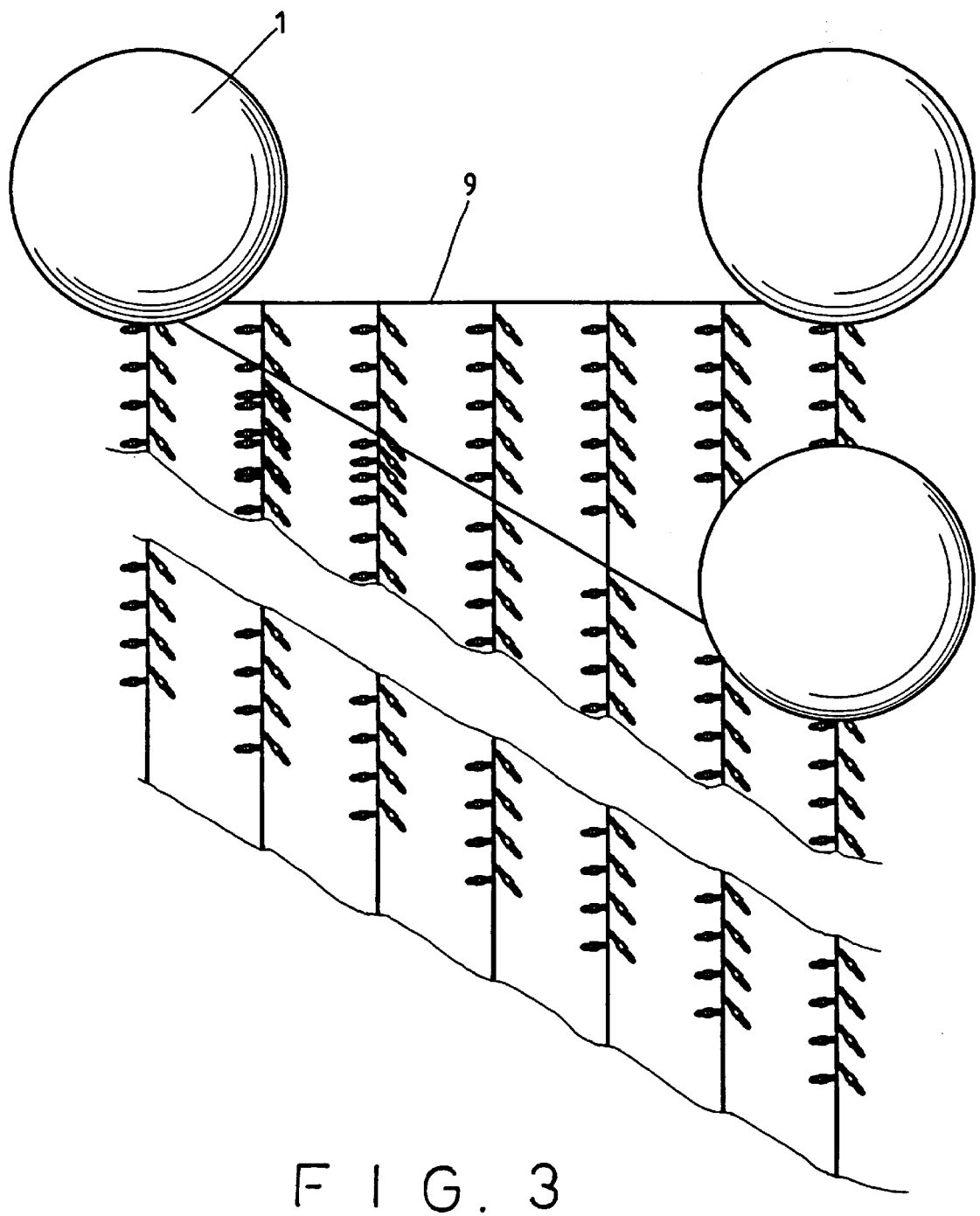
FIG. 3 is a side view showing an operation with many balloons and strings of luminaries of the present invention.

Referring to FIG. 3, a cable 9 has tied many balloons 1 communicating with each other to form a desired structure so that many strings of the micro-bulbs 2 can be suspended on the cable 9 downwardly.

Figure 4:
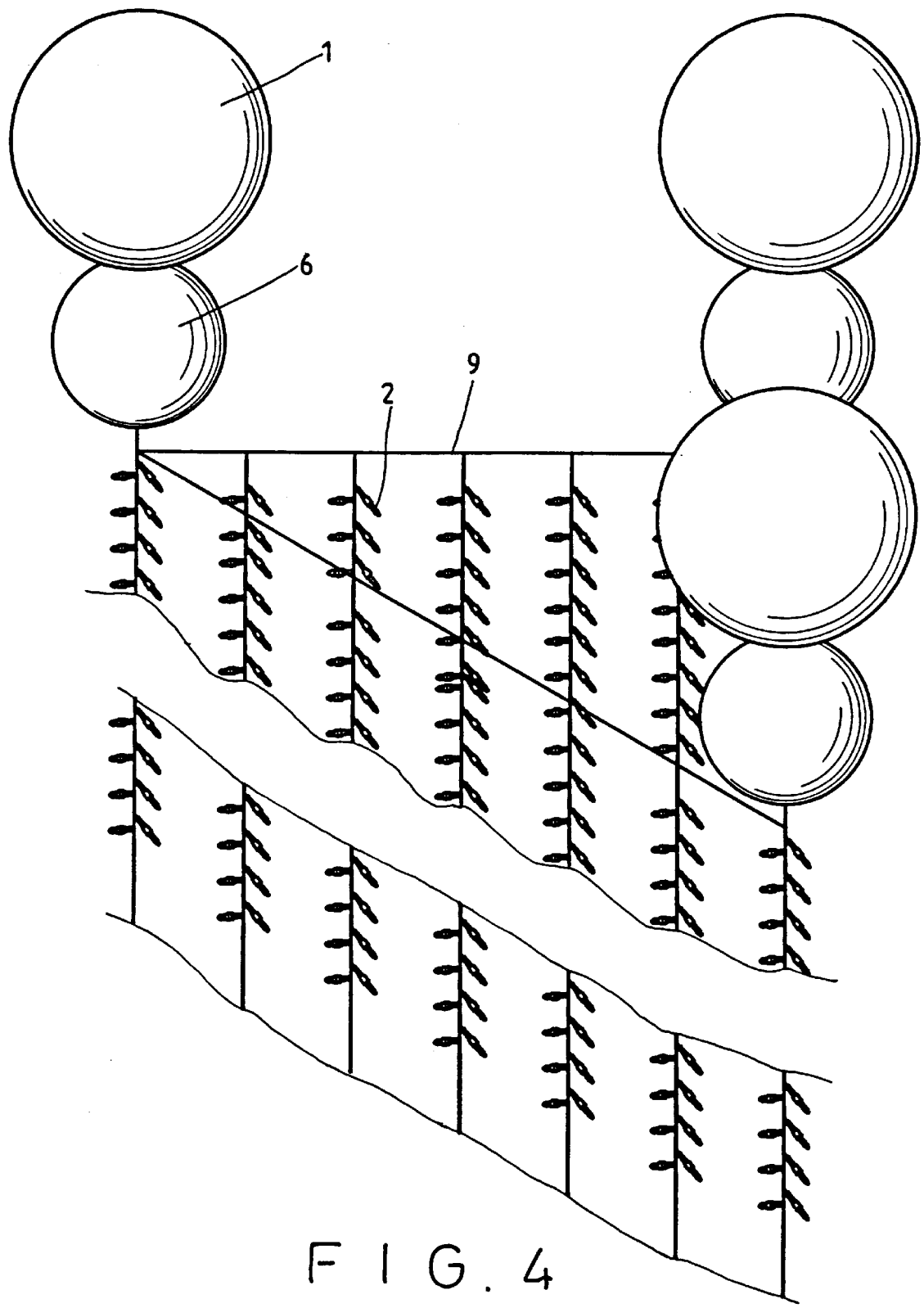
FIG. 4 is a side view showing an operation with many balloons and strings of luminaries of the present invention.

Referring to FIG. 4, the cable 9 not only connects many balloons 1, but also many objects 6 so that many strings of the micro-bulbs 2 can be suspended on the cable 9 downwardly.

Figure 5:
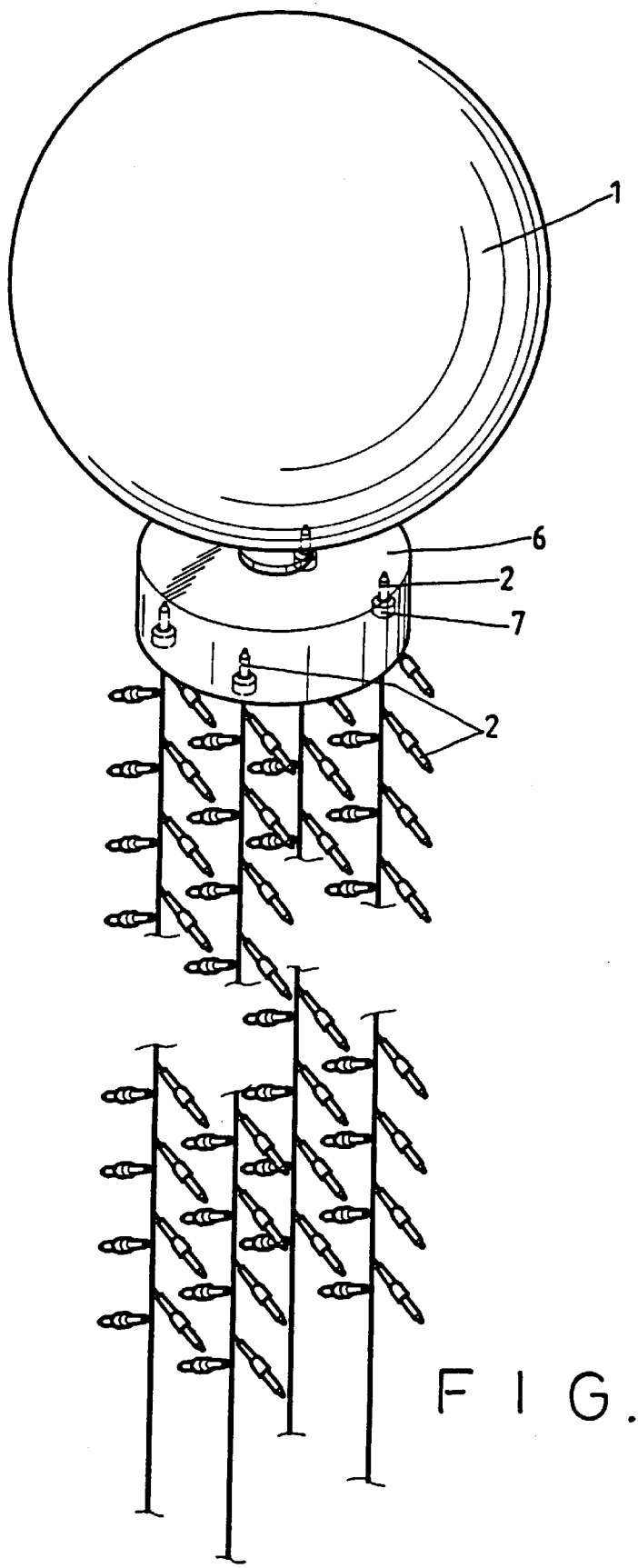
FIG. 5 is a side view showing an operation with a balloon and many strings of luminaries of the present invention.

Referring to FIG. 5, the connecting object 6 has more than one threaded holes 7 for fixing corresponding number of strings of micro-bulbs 2.

Additional, the luminary can be light emitting diode or neon lamp, and so on.

I claim:

1. An air suspended luminary comprising:

a balloon floating above a ground surface;

a transparent connecting object suspended on a lower portion of said balloon and having a hollow interior, said connecting object having at least one threaded hole formed therein; and, a string of luminaries coupled to said connecting object and suspended therefrom, said string of luminaries including (a) a pair of electrical cords secured on a first end to said object and a second end to the ground surface, and (b) a plurality of luminaries electrically coupled to said pair of cords; and, a connecting bolt having a first end coupled to said first end of said pair of electrical cords and a second end threadedly engaged with said at least one threaded hole of said connecting object, said connecting bolt having one luminary fixed on said second end thereof for positioning said one luminary within said hollow interior of said connecting object to light said connecting object.

* * * * *